United States Patent
Dommaschk et al.

(10) Patent No.: US 7,960,871 B2
(45) Date of Patent: Jun. 14, 2011

(54) CONTROL OF A MODULAR CONVERTER WITH DISTRIBUTED ENERGY STORAGE DEVICES

(75) Inventors: Mike Dommaschk, Guteborn (DE); Jörg Dorn, Buttenheim (DE); Ingo Euler, Erlangen (DE); Jörg Lang, Stadtsteinach (DE); Quoc-Buu Tu, Rosstal (DE); Klaus Würflinger, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 179 days.

(21) Appl. No.: 12/517,693

(22) PCT Filed: Dec. 8, 2006

(86) PCT No.: PCT/DE2006/002247
§ 371 (c)(1),
(2), (4) Date: Jun. 4, 2009

(87) PCT Pub. No.: WO2008/067784
PCT Pub. Date: Jun. 12, 2008

(65) Prior Publication Data
US 2010/0067266 A1      Mar. 18, 2010

(51) Int. Cl.
*G05F 3/06*        (2006.01)

(52) U.S. Cl. .................................................... 307/151
(58) Field of Classification Search .................. 307/151
See application file for complete search history.

(56) References Cited

U.S. PATENT DOCUMENTS
7,835,166 B2 * 11/2010 Hiller ............................ 363/132
* cited by examiner

*Primary Examiner* — Robert L. Deberadinis
(74) *Attorney, Agent, or Firm* — Laurence A. Greenberg; Werner H. Stemer; Ralph E. Locher (57) ABSTRACT

A device for converting an electrical current includes at least one phase module with an AC connection and at least one DC connection. A phase module branch is provided between each DC connection and each AC connection. Each phase module branch has a series connection made of sub-modules, which in turn include an energy accumulator each and at least one power semiconductor. Measuring sensors provide actual values and there are provided control means connected to the measuring sensors. The control can be easily adapted to any arbitrary number of sub-modules in each phase module branch. The control means include a current regulating unit and control units associated with a phase module branch each, wherein the current regulating unit is configured to provide branch target values for the control units. The control units are designed to produce control signals for the sub-modules.

25 Claims, 10 Drawing Sheets

CONTROL OF A MODULAR CONVERTER WITH DISTRIBUTED ENERGY STORAGE DEVICES

BACKGROUND OF THE INVENTION

Field of the Invention

The present invention relates to an apparatus for conversion of an electric current having at least one phase module which has an AC voltage connection and at least one DC voltage connection with a phase module branch being formed between each DC voltage connection and the AC voltage connection and with each phase module branch having a series circuit of submodules which each have an energy storage device and at least one power semiconductor, having measurement sensors for provision of actual values, and having closed-loop control means which are connected to the measurement sensors and are designed to regulate the apparatus as a function of the actual values and predetermined nominal values.

The present invention likewise relates to a method for conversion of a current.

An apparatus such as this and a method such as this are already known, for example, from the article by A. Lesnicar and R. Marquardt "An Innovative Modular Multilevel Converter Topology Suitable for a Wide Power Range" which appeared at Powertech 2003. This discloses a converter which is intended for connection to an AC voltage network. The converter has one phase module for each phase of the AC voltage network to be connected to it, with each phase module having one AC voltage connection and two DC voltage connections. Phase module branches extend between each DC voltage connection and the AC voltage connection, thus providing a so-called 6-pulse bridge circuit. The module branches comprise a series circuit of submodules which each comprise two power semiconductors which can be turned off, each of which have back-to-back freewheeling diodes connected in parallel with them. The power semiconductors which can be turned off and the freewheeling diodes are connected in series, with a capacitor being provided in parallel with said series circuit. Said components of the submodules are connected to one another such that the voltage at the two-pole output of each submodule is either the capacitor voltage or zero.

The power semiconductors which can be turned off are controlled by means of so-called pulse-width modulation. The closed-loop control means for controlling the power semiconductors have measurement sensors for detection of currents, with current values being obtained. The current values are supplied to a central control unit, which has an input interface and an output interface. A modulator, that is to say a software routine, is provided between the input interface and the output interface. Inter alia, the modulator has a selection unit and a pulse-width generator. The pulse-width generator produces the control signals for the individual submodules. The power semiconductors which can be turned off are switched by the control signals, which are produced by the pulse-width generator, from a switched-on state, in which current can flow via the power semiconductors which can be turned off, to a switched-off state, in which any current flow via the power semiconductors which can be turned off is interrupted. In this case, each submodule has a submodule sensor for detection of a voltage across the capacitor.

Further contributions to the control method for a so-called multilevel converter topology are known from R. Marquardt, A. Lesnicar, J. Hildinger, "Modulares Stromrichterkonzept für Netzkupplungsanwendung bei hohen Spannungen", [Modular Converter Concept for Network Coupling Application at high voltages], which appeared at the ETG Symposium in Bad Nauenheim, Germany 2002, by A. Lesnicar, R. Marquardt, "A new modular voltage source inverter topology", EPE '03 Toulouse, France 2003 and from R. Marquardt, A. Lesnicar "New Concept for High Voltage—Modular Multilevel Converter", PESC 2004 Conference in Aachen, Germany.

A method for control of a polyphase converter with distributed energy storage devices has been disclosed in German Patent Application 10 2005 045 090.3, which has currently not yet been published. The disclosed apparatus likewise has a multilevel converter topology with phase modules which have two DC voltage connections, and one AC voltage connection, which is arranged symmetrically at the center of each phase module. Each phase module is composed of two phase module branches, which extend between the AC voltage connection and one of the DC voltage connections. Each phase module branch in turn comprises a series circuit of submodules, with each submodule comprising power semiconductors which can be turned off and freewheeling diodes connected back-to-back in parallel with them. Furthermore, each submodule has a unipolar capacitor. The closed-loop control means are used to regulate the power semiconductors and are also designed to adjust branch currents which flow between the phase modules. By way of example, current oscillations can be actively damped and operating points with relatively low output frequencies can be avoided by control of the branch currents. Furthermore, this makes it possible to uniformly load all the semiconductor switches which can be turned off, and to balance highly unbalanced voltages.

BRIEF SUMMARY OF THE INVENTION

One object of the invention is to provide an apparatus of the type mentioned initially whose regulation can easily be matched to any desired number of submodules in each phase module branch.

On the basis of the apparatus mentioned initially, the invention achieves this object in that the closed-loop control means have a current regulation unit and drive units which are each associated with one phase module branch, with the current regulation unit being designed to provide branch nominal values for the drive units, and with the drive units being connected between the submodules and the current regulation unit and being designed to produce control signals for said submodules.

On the basis of the method mentioned initially, the invention achieves this object in that a current regulation unit is supplied with actual values and with nominal values, the current regulation unit defines branch nominal values as a function of the actual values and the nominal values by means of a regulator, which branch nominal values are respectively associated with one phase module branch, the branch nominal values are each supplied to a drive unit associated with said phase module branch, and each drive unit produces control signals for the submodules associated with it, as a function of the branch nominal values.

The apparatus according to the invention has closed-loop control means which comprise a central current regulation unit. Said current regulation unit is connected to the measurement sensors, which are provided in order to detect electrical measurement variables, such as current or voltage, with the measured values being supplied to the regulation system as so-called actual values. Furthermore, the current regulation unit is supplied with nominal values to which the actual values are intended to be matched. If, for example, the nominal values are a predetermined nominal in-phase power, a change in the DC, for example, in order to achieve the nominal in-phase power also results in a change to the alternating currents on the AC voltage side of the converter. In other words, the actual values are coupled to one another to a high degree. The current regulation unit is therefore essentially used for decoupling of the regulator variables.

In contrast to the control methods known from the prior art, the control signals for the submodules, according to the invention, are not produced by a central current regulation unit. In fact, an independent drive unit is provided for each phase module branch. The current regulation unit produces at least one branch nominal value for each drive unit. The drive unit then determines and produces the control signals for the individual submodules on the basis of each branch nominal value. The apparatus according to the invention therefore has closed-loop control means which can easily be matched to a changing number of submodules. The current regulation unit is designed just for the number of phase module branches, which is independent of the number of submodules in each phase module branch. Matching of the apparatus according to the invention, that is to say of the converter according to the invention, to a different network voltage or DC voltage, with an increase in the number of submodules in consequence, therefore affects only the drive units.

Each submodule advantageously has a submodule sensor which is connected to the drive unit associated with that submodule and provides a submodule actual value. The submodule actual value is supplied to the linked drive unit, which then forms a submodule sum actual value by addition of the submodule actual values which originate from submodules which have been switched on, or in other words have been switched to be active, by the drive unit. Only submodules which have been switched to be active in a phase module branch make any contribution to the corresponding submodule sum actual value of that phase module branch. In this case, the drive unit produces control signals for the individual submodules such that the submodule sum actual value corresponds as accurately as possible to the branch nominal value provided by the current regulation unit.

The submodule actual value is expediently an energy storage device voltage value Uc, which corresponds to a voltage across the energy storage device of the respective submodule. In this case, the branch nominal value is a branch voltage nominal value, that is to say a nominal value for the total voltage across those submodules in a phase module branch which have been switched on or have been switched to be active.

Each drive unit is advantageously connected to all the submodule sensors of the phase module branch associated with it and is designed to provide a branch energy actual value for the current regulation unit, with the branch energy actual value being the sum of the submodule actual values of all the submodules, that is to say both the active submodules that are switched on and the inactive submodules which have been turned off in the respective phase module branch. Furthermore, the branch energy actual value is itself used to determine the branch nominal value and in particular the branch voltage nominal value.

According to one advantageous further development, the current regulation unit is designed to provide a branch voltage nominal value Up1ref, Up2ref, Up3ref, Un1ref, Un2ref, Un3ref for each drive unit.

The measurement sensors expediently comprise branch current sensors which are designed to measure phase module branch currents Izwg which are flowing in the phase module branches. According to this advantageous further development, it is possible to regulate the phase module branch currents. The phase module branch currents Izwg comprise phase currents which are flowing on the AC voltage side of the phase module, that is to say by way of example between a transformer for connection of an AC voltage network to the apparatus according to the invention and the AC voltage connection of the phase module. Furthermore, the phase module branch currents comprise DC components and circulating currents. If all the phase module branch currents of the apparatus are known, the circulating currents can be calculated. Since the circulating currents are not externally visible, their regulation allows independent balancing of the energy stored in the phase module branches. All degrees of freedom of the apparatus according to the invention can be effectively used by regulation of the phase module branch currents and therefore of the circulating currents. For example, active damping of the circulating currents considerably reduces the complexity which has to be accepted in conjunction with passive elements, for example in conjunction with branch current inductors.

The current regulation unit is therefore advantageously designed to regulate the phase module branch currents Izwg.

According to one preferred further development, the nominal values comprise a reactive current nominal value Iqref, a in-phase current nominal value Ipref and/or a DC nominal value Id. This allows a user to handle the apparatus according to the invention in a particularly simple manner. The user therefore just enters into the regulation system the in-phase power and reactive power to be transmitted. Reactive current nominal values are determined from this with knowledge of the prevailing rated voltages.

With regard to the method according to the invention, it is advantageous for the actual values to comprise branch energy actual values which are transmitted by the drive units to the current regulation unit, with each branch energy actual value once again being the sum of the submodule actual values of all the submodules in a phase module branch, irrespective of whether or not they have been switched on.

The branch nominal values are advantageously formed by a linear combination of voltage intermediate nominal values. The voltage intermediate nominal values are very largely decoupled from one another and are used to set up a specific and clear regulation system.

According to one expedient further development relating to this, the voltage intermediate nominal values comprise a DC voltage nominal value Udc, with the DC voltage nominal value Udc being determined as a function of the difference between a predetermined reference DC Idsoll and a DC measured value Id obtained by measurement.

According to one expedient further development relating to this, a total voltage difference is determined by formation of the difference between a predetermined sum voltage nominal value ucref and a total energy measured value uc which is determined by addition of the voltages across all the energy storage devices of the converter, and the total voltage difference is supplied to a regulator with a total energy discrepancy current value being obtained, with the total energy discrepancy current value being added to a DC nominal value Idref, with the reference DC value Idsoll being obtained. The regulator which is used in this case is, for example, a simple proportional regulator. However, other regulators can also be used for the purposes of the invention. According to this advantageous further development, the regulation system ensures that the energy which is stored in the energy storage device cannot be increased beyond a predetermined level. This therefore prevents the apparatus according to the invention being destroyed by storage of an excessively large amount of energy. It is obvious to a person skilled in the art that, when adjusting the total energy of the apparatus according to the invention, that is to say of the converter, instead of addition of the measured voltage measured values of all the energy storage devices of the apparatus, it is also possible to determine the energy which is stored in the energy storage devices of the submodules, with energy measured values being determined. uc would then correspond to the sum of the energy values of all the energy storage devices in the apparatus. By way of example, a measure of the energy value of an energy storage device is obtained from the voltage across the said energy storage device, simply by squaring said voltage.

The voltage intermediate nominal values for each drive unit advantageously comprise network phase voltage nominal values Unetz1, Unetz2, Unetz3. The network phase voltage nominal values Unetz1, Unetz2, Unetz3 therefore essentially affect the apparatus such that a desired phase current I1, I2, I3 is produced, which flows on the AC voltage side of each phase module.

According to one expedient further development relating to this, the network phase voltage nominal values Unetz1, Unetz2, Unetz3 are determined from phase current values which are obtained by measurement of the phase currents I1, I2, I3 on the AC voltage side of the phase modules, as a function of current nominal values, by means of a regulator. According to this expedient further development, the phase currents are measured on the AC voltage side of the apparatus according to the invention. This can be done, for example, in the immediate vicinity of the AC voltage connections of the phase modules. For this purpose, appropriate current transformers are made to interact with an AC conductor, with the AC conductors being connected to the AC voltage connection. In contrast to this, however, the network current In1, In2 and In3 can also be measured which is flowing in each phase of the AC network which is connected to the AC voltage connections via the AC conductor and a transformer.

According to one expedient further development relating to this, the network phase voltage nominal values Unetz1, Unetz2, Unetz3 are determined as a function of phase voltage measured values, which are obtained by measurement of the phase voltages U1, U2, U3 on the AC voltage sides of the phase modules, as a function of nominal values, by means of a regulator. The network phase voltage nominal values Unetz1, Unetz2, Unetz3 can therefore also be obtained on the basis of the measurement of the network voltages.

The voltage intermediate nominal values for each phase module branch advantageously comprise a branch voltage intermediate nominal value Uzwgp1, Uzwgp2, Uzwgp3, Uzwgn1, Uzwgn2, Uzwgn3.

According to one expedient further development relating to this, the branch voltage intermediate nominal values Uzwgp1, ..., Uzwgn3 are determined as a function of extended branch current values Ip1, Ip2, Ip3, In1, In2, In3, by means of a regulator.

Each extended branch current value Ip1, Ip2, Ip3, In1, In2, In3 is advantageously determined by formation of the sum of a phase module branch current measured value Izwgp1, ..., Izwgn3, which is obtained by detection of a phase module branch current flowing in the respective phase module branch, of defined circulating-current nominal values Ikr1, Ikr2, Ikr3 and of defined balancing current nominal values Ibalp1, ..., Ibaln3, with the balancing current nominal values Ibalp1, ... Ibaln3 being determined as a function of the branch energy actual values. The nominal values which are predetermined in this regulation step, that is to say the circulating-current nominal values Ikr1, Ikr2, Ikr3, for definition of the circulating currents, which are components of the branch currents, and the balancing current nominal values Ibalp1, ..., Ibaln3 for definition of a balancing current, are added up together with the phase module branch current measured value Izwg determined by measurement, with their sum value corresponding to said extended branch current value Ip1, ..., In3. The extended branch current value is then expediently supplied to a regulator, which uses this to produce branch voltage intermediate nominal values Uzwg.

The branch voltage intermediate nominal values advantageously comprise an unbalanced nominal voltage Uasym.

According to one expedient further development relating to this, the unbalanced nominal voltage Uasym is defined by measurement of the voltage between a positive DC connection and ground, with a positive DC voltage value Udp being obtained, and by measurement of the voltage between a negative DC voltage connection and ground, with a negative DC voltage value Udn being obtained, by formation of the difference between the magnitudes of the positive and the negative DC voltage values, with a DC voltage difference Δud being obtained, and by application of the DC voltage difference Δud to the input of a regulator, with the unbalanced nominal voltage being obtained at the output of the regulator.

The branch voltage intermediate nominal values expediently have balancing voltage nominal values Ubalp1, Ubalp2, Ubalp3, Ubaln1, Ubaln2, Ubaln3, with energy storage device voltage values Uc which correspond to the voltages across the energy storage devices being detected, with the energy storage device voltage values Uc of a phase module branch $6p1$, $6p2$, $6p3$, $6n1$, $6n2$, $6n3$ being added, with branch energy actual values UcΣp1, UcΣp2, UcΣp3, UcΣn1, UcΣn2, UcΣn3 being obtained with the branch energy actual values UcΣp1, UcΣp2, UcΣp3, UcΣn1, UcΣn2, UcΣn3 being compared with one another and with a value derived from the comparison being transmitted to a regulator, and with the balancing compensation voltages Ubalp1, Ubalp2, Ubalp3, Ubaln1, Ubaln2, Ubaln3 being tapped off at the output of the regulator. All the submodules of a submodule branch are taken into account in the formation of the branch energy actual values, irrespective of whether or not they are switched on. The branch energy actual values thereby represent a measure of the energy which is stored in a phase module branch. A person skilled in the art will be aware that, in this context, it is also possible to add up the squares of the voltages across the energy storage devices, rather than the voltages themselves, and to form the branch energy actual value in this way. Furthermore, it should also be noted that the apparatus according to the invention can also be balanced by the balancing current nominal values Ibal described further above.

Extended branch current values Ip1, ..., In3 are advantageously broken down as input variables of the regulation system into a network current component and a circulating current component in order to determine the branch voltage intermediate nominal values Uzwgp1, ..., Uzwgn3. This breakdown allows the regulation steps which the current regulating unit carries out to be set up clearly.

Each extended branch current value Ip1, ..., In3 is advantageously regulated independently of the remaining branch current values Ip1, ..., In3. This means that every extended branch current value is supplied, for example, together with expedient nominal values, in each case to a single regulator. The branch voltage intermediate nominal values Uzwgp1, ..., Uzwgn3 can be tapped off at the output of the regulator.

According to a further advantageous refinement of the invention, phase current values I1, I2, I3 are obtained by measurement of the phase currents on the AC voltage side and phase voltage values U1, U2, U3 are obtained by measurement of the phase voltages on the AC voltage sides of the phase module branches, auxiliary current values IHal, IHbe, are determined from the phase current values I1, I2, I3 and the phase voltage values U1, U2, U3 as a function of nominal values, by means of a regulator, the auxiliary current values IHal, IHbe are added to or subtracted from the extended branch current values Ip1, . . . , In3, with auxiliary sums or auxiliary differences being obtained, with the auxiliary sums and the auxiliary differences being applied to the input of a regulator, and the branch voltage intermediate nominal values Uzwgp1, . . . , Uzwgn3 being tapped off at the output of said regulator. In this case, by way of example, the regulator is a proportional regulator.

BRIEF DESCRIPTION OF THE SEVERAL VIEWS OF THE DRAWING

Further expedient refinements and advantages of the invention are the subject matter of the following description of exemplary embodiments of the invention with reference to the figures of the drawing, in which the same reference symbols refer to components having the same effect, and in which.

DESCRIPTION OF THE INVENTION

Figure 1:
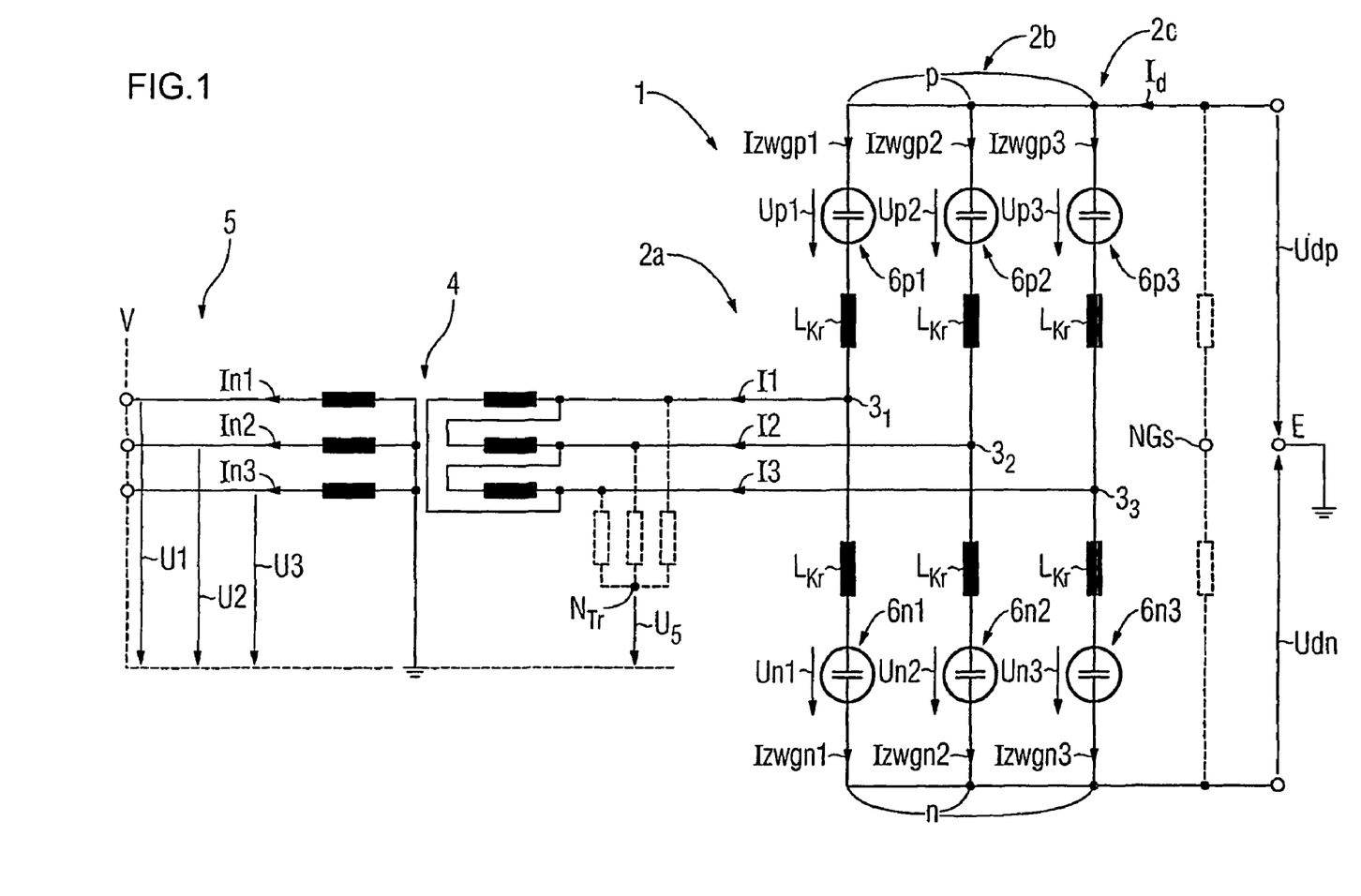
FIG. 1 shows a schematic illustration of one exemplary embodiment of an apparatus according to the invention.

FIG. 1 shows one exemplary embodiment of the apparatus 1 according to the invention, which comprises three phase modules 2a, 2b and 2c. Each phase module 2a, 2b and 2c is connected to a positive DC voltage line p and to a negative DC voltage line n, in such a way that each phase module 2a, 2b, 2c has two DC voltage connections. Furthermore, a respective AC voltage connection $3_1$, $3_2$ and $3_3$ is provided for each phase module 2a, 2b and 2c. The AC voltage connections $3_1$, $3_2$ and $3_3$ are connected via a transformer 4 to a three-phase AC voltage network 5. The phase voltages between the phases of the AC voltage network 5 are U1, U2 and U3, with network currents In1, In2 and In3 flowing. The phase current on the AC voltage side of each phase module is denoted I1, I2 and I3. The DC is $I_d$. Phase module branches 6p1, 6p2 and 6p3 extend between each of the AC voltage connections $3_1$, $3_2$ or $3_3$ and the positive DC voltage line p. The phase module branches 6n1, 6n2 and 6n3 are formed between each AC voltage connection $3_1$, $3_2$, $3_3$ and the negative DC voltage line n. Each phase module branch 6p1, 6p2, 6p3, 6n1, 6n2 and 6n3 comprises a series circuit of submodules, which are not illustrated in detail in FIG. 1, and an inductance, which is denoted $L_{Kr}$ in FIG. 1.

Figure 2:
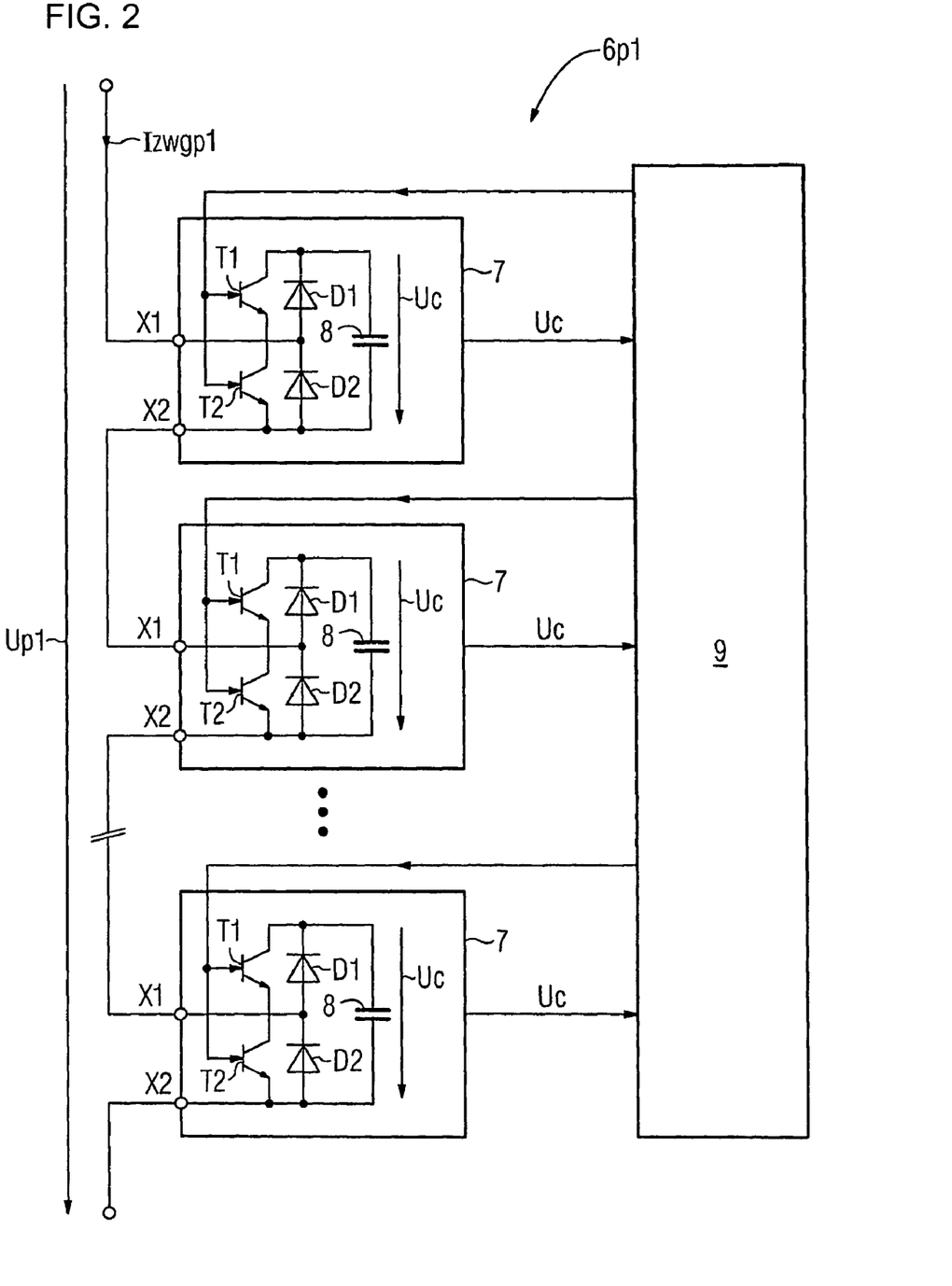
FIG. 2 shows an equivalent circuit illustration of a submodule of an apparatus as shown in FIG. 1.

In FIG. 2, the series circuit of the submodules 7 and, in particular, the design of the submodules are illustrated in more detail in the form of an electrical equivalent circuit, although only the phase module branch 6p1 has been picked out in FIG. 2. The remaining phase module branches are, however, of identical design. As can be seen, each submodule 7 has two power semiconductors T1 and T2, which are connected in series and can be turned off. By way of example, power semiconductors which can be turned off are so-called IGBTs, GTOs, IGCTs or the like. These are known per se to a person skilled in the art and therefore do not need to be descried in detail at this point. Each power semiconductor T1, T2 which can be turned off has a freewheeling diode D1, D2 connected back-to-back in parallel with it. A capacitor 8 is connected as an energy storage device in parallel with the series circuit of the power semiconductors T1, T2 which can be turned off and the freewheeling diodes D1 and D2. Each capacitor 8 is charged on a unipolar basis. Two voltage states can now be produced at the two-pole connecting terminals X1 and X2 of each submodule 7. For example, if the drive unit 9 is producing a drive signal, by means of which the power semiconductor T2 which can be switched off is switched to its switched-on state, in which a current can flow via the power semiconductor T2, the voltage between the terminals X1, X2 of the submodule 7 is zero. In this case, the power semiconductor T1 which can be turned off is in its switched-off state, in which any current flow via the power semiconductor T1 which can be turned off is interrupted. This prevents the discharging of the capacitor 8.

If, in contrast, the power semiconductor T1 which can be turned off is in its switched-on state, but the power semiconductor T2 which can be turned off has been switched to its switched-off state, the entire capacitor voltage Uc is applied between the terminals X1, X2 of the submodule 7.

The exemplary embodiment of the apparatus according to the invention as shown in FIGS. 1 and 2 is also referred to as a so-called multilevel converter. A multilevel converter such as this is, for example, suitable for driving electrical machines, such as motors or the like. Furthermore, a multilevel converter such as this is also suitable for use in the power distribution and transmission field. By way of example, the apparatus according to the invention is used as a back-to-back link which comprises two converters connected to one another on the DC voltage side, with each of the converters being connected to an AC voltage network. Back-to-back links such as these are used to exchange energy between two power distribution networks when, for example, the power distribution networks have a different frequency, phase angle, star-point connection or the like. Furthermore, applications may be considered in the field of power factor correction, as so-called FACTS (Flexible AC Transmission Systems). High-voltage DC transmission over long distances is also feasible using multilevel converters such as these. Because of the range of different application options, there are a large number of different operating voltages to which the respective apparatus according to the invention has to be matched. For this reason, the number of submodules may vary from a few up to several hundred submodules 7. In order to allow this very large number of submodules 7 to access closed-loop control means which can easily be matched to the different numbers of submodules 7, the invention has a structure which is different to that according to the prior art.

Figure 3:
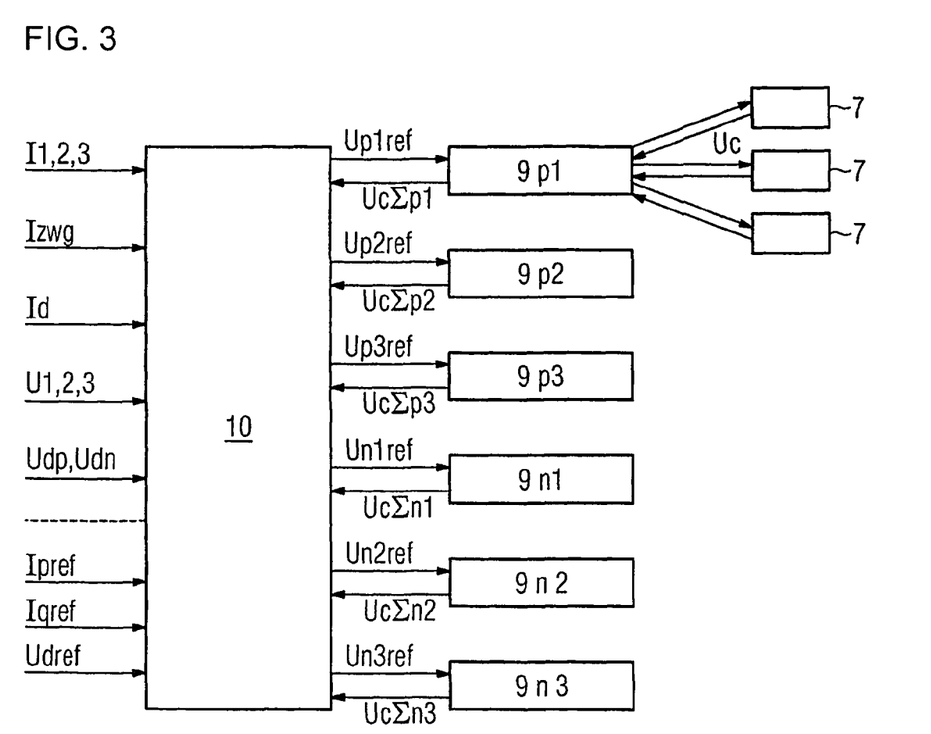
FIG. 3 shows the structure of the closed-loop control means of an apparatus as shown in FIG. 1.

FIG. 3 illustrates said structure of the closed-loop control means. The closed-loop control means comprise a current regulation unit 10 as well as drive units 9$p$1, 9$p$2, 9$p$3 and 9$n$1 and 9$n$2 and 9$n$3. Each of the drive units is associated with a respective phase module branch 6$p$1, 6$p$2, 6$p$3, 6$n$1, 6$n$2 and 6$n$3. For example, the drive unit 9$p$1 is connected to each submodule 7 of the phase module branch 6$p$1 and produces the control signals for the power semiconductors T1, T2 which can be turned off. A submodule voltage sensor, which is not illustrated in the figures, is provided in each submodule 7. The submodule voltage sensor is used to detect the capacitive voltage across the capacitor 8 of the submodule 7, with a capacitor voltage value Uc being obtained as the submodule actual value. The capacitor voltage value Uc is made available to the respective drive unit, in this case 9$p$1. The drive unit 9$p$1 therefore receives the capacitor voltage values of all the submodules 7 of the phase module branch 6$p$1 associated with it, and adds these to obtain a branch energy actual value Uc$\Sigma$p1, which is likewise associated with the phase module branch 6$p$1. Furthermore, each evaluation unit 9$p$ determines a submodule actual value. The submodule actual value is calculated from the sum of the active submodules between whose output terminals X1 and X2 the capacitive voltage Uc is produced. Inactive submodules 7 between whose output terminals X1, X2 the voltage is zero are ignored in the formation of the submodule actual value. In particular, the branch energy actual value Uc$\Sigma$p1 is supplied to the current regulation unit 10.

In addition, the current regulation unit 10 is connected to various measurement sensors, which are not illustrated in the figures. For example, current transformers which are arranged on the AC voltage side of the phase modules 2$a$, 2$b$, 2$c$ are used to produce and supply phase current measured values I1, I2, I3, and current transformers which are arranged on each phase module are used to produce and supply phase module branch current measured values Izwg, and a current transformer which is arranged in the DC circuit of the converter is used to provide DC measured values Id. Voltage converters in the AC network provide phase voltage measured values of the phase voltages U1, U2, U3 and DC voltage converters provide positive DC voltage measured values of the positive DC voltage Udp and negative DC voltage measured values of the negative DC voltage Udn, with the positive DC voltage measured values Udp corresponding to a DC voltage between the positive DC voltage connection p and ground, and with the negative DC voltage measured values Udn corresponding to a voltage between the negative DC voltage connection and ground. The negative DC voltage is negative. The positive DC voltage is positive.

Furthermore, nominal values are supplied to the current regulation unit 10. In the exemplary embodiment shown in FIG. 3, an in-phase current nominal value Ipref and a reactive current nominal value Iqref are supplied to the regulation unit 10. Furthermore, a DC voltage nominal value Udref is applied to the input of the current regulation unit 10. Instead of the DC voltage nominal value Udref, a DC nominal value Idref can also be used for further regulation purposes. These two nominal values can therefore be interchanged with one another.

The nominal values Ipref, Iqref and Udref and said measured values interact with one another with the use of different regulators with a branch voltage nominal value Up1ref, Up2ref, Up3ref, Un1ref, Un2ref, Up3ref being produced for each drive unit 9$p$1, 9$p$2, 9$p$3, 9$n$1, 9$n$2 and 9$n$3, respectively. Each drive unit 9 produces control signals for the submodules 7 associated with it, as a result of which the voltage Up1, Up2, Up3, Un1, Un2, Un3 across the series circuit of the submodules corresponds as closely as possible to the respective branch voltage nominal value Up1ref, Up2ref, Up3ref, Un1ref, Un2ref, Un3ref. The voltage Up, Up2, Up3, Un1, Un2, Un3 is referred to as the submodule sum actual value.

Figure 4:
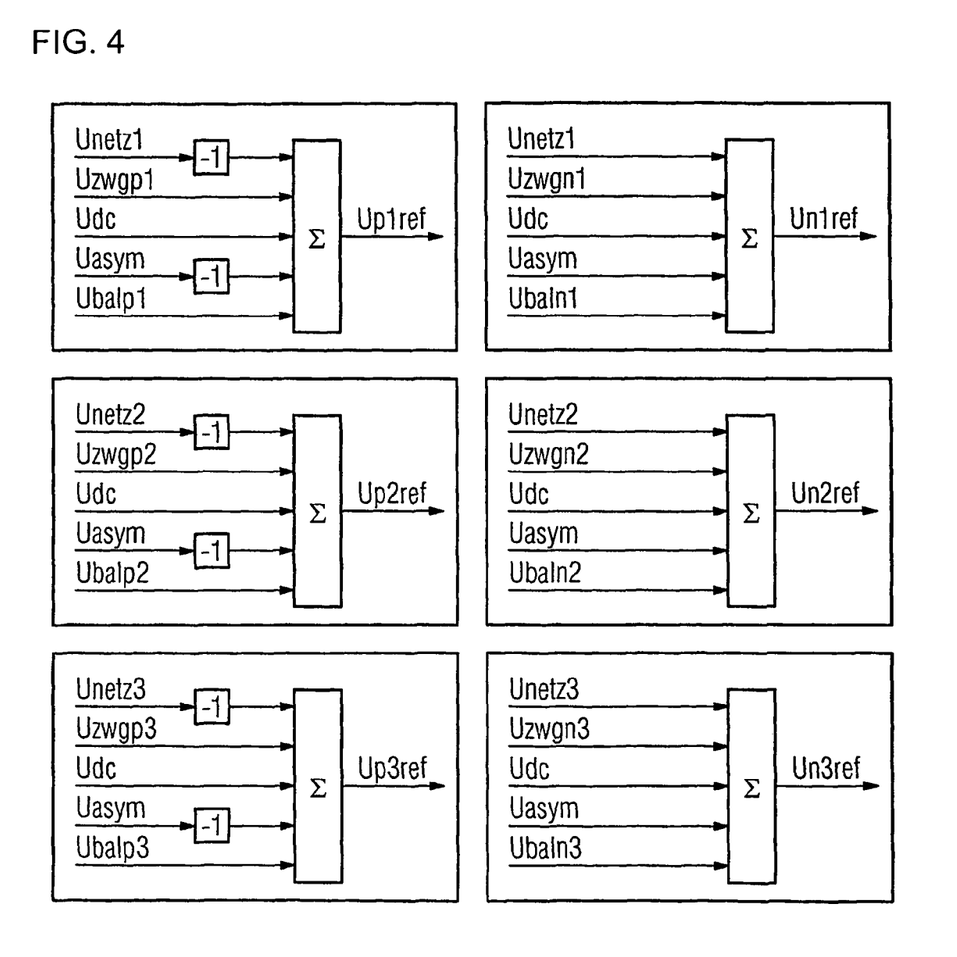
FIG. 4 shows a linear combination of branch voltage intermediate nominal values in order to determine the branch voltage nominal values for the drive units, illustrated schematically.

The other figures illustrate how the current regulation unit 10 forms suitable branch voltage nominal values Up1ref, Up2ref, Up3ref, Up1ref, Un2ref, Un3ref from its input values. For example, FIG. 4 shows that the branch voltage nominal value Up1ref is calculated by linear combination of a network phase voltage nominal value Unetz1, a branch voltage intermediate nominal value Uzwgp1, a DC voltage nominal value Udc, a balancing voltage nominal value Uasym and a balancing voltage nominal value Udalp1. This is done for each of the phase module branches 6$p$1, 6$p$2, 6$p$3, 6$n$1, 6$n$2 and 6$n$3 independently of one another.

Figure 5:
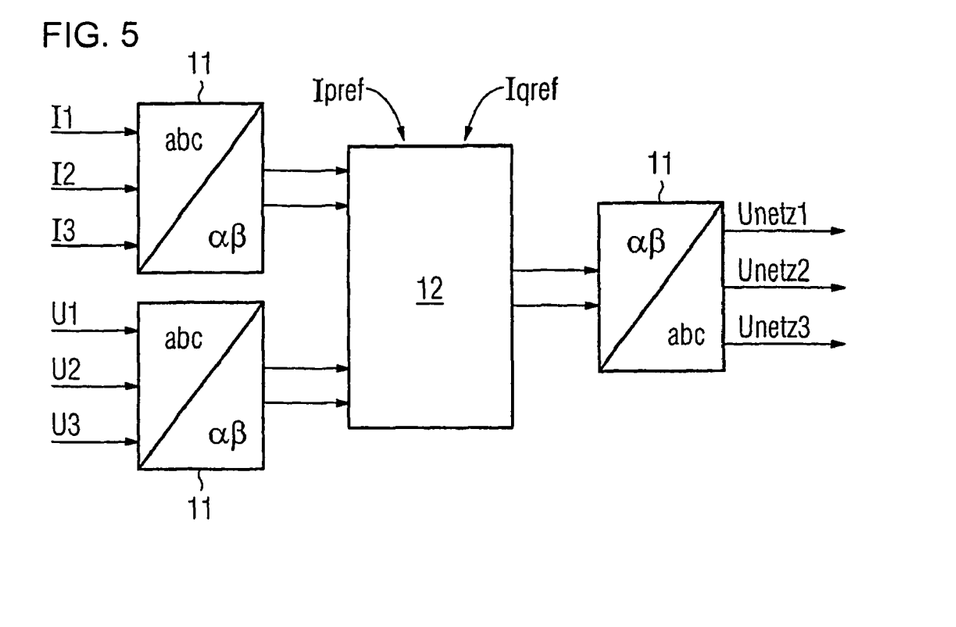
FIG. 5 shows a schematic illustration of the determination of network phase voltage nominal values Unetz.

FIG. 5 shows how the network phase voltage nominal values Unetz1, Unetz2 and Unetz3 are determined from the phase current measured values I1, I2 and I3 and from the phase voltage measured values U1, U2, U3. Since the phase current measured values result in a total of zero, the phase current measured values I1, I2, I3 of the three phases can be projected into a two-phase vector system $\alpha$, $\beta$. This is done by means of the conversion unit 11. A corresponding situation applies to the phase voltage measured values U1, U2, U3. The measured values are then supplied to a regulator 12 which produces the network phase voltage nominal values Unetz1, Unetz2, Unetz3 as a function of the in-phase current nominal value Ipref and as a function of a reactive current nominal value Iqref, once again with a conversion unit 11 being used to convert the two-dimensional network phase voltage nominal values to three-dimensional network phase voltage nominal values.

Figure 6:
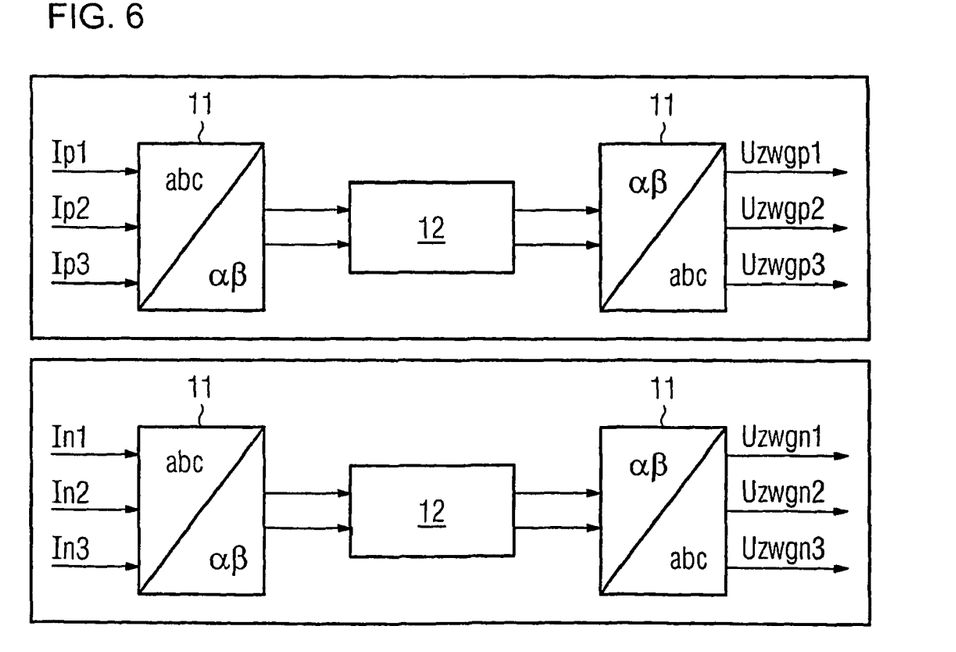
FIG. 6 shows a schematic illustration in order to illustrate the method step for determination of branch voltage intermediate nominal values Uzwg from extended branch current values.

FIG. 6 shows how the branch voltage intermediate nominal values Uzwgp1, Uzwgp2 and Uzwgp3, as well as Uzwgn1, Uzwgn2 and Uzwgp3, which are annotated for the first time in figure 4, are formed. This is done on the basis of extended branch current values Ip1, Ip2, Ip3, In1, In2, In3, whose determination is described in the following text. The six extended branch current values Ip1, Ip2, Ip3, In1, In2, In3 are once again converted, as described above, by a conversion unit 11 to four extended two-dimensional branch current values $\alpha$, $\beta$. A regulator 12, which in this case is a simple proportional regulator, then in each case ensures, together with the conversion unit 11, conversion to so-called branch voltage intermediate nominal values Uzwgp1, Uzwgp2 and Uzwgp3, as well as Uzwgn1, Uzwgp2 and Uzwgp3.

Figure 7:
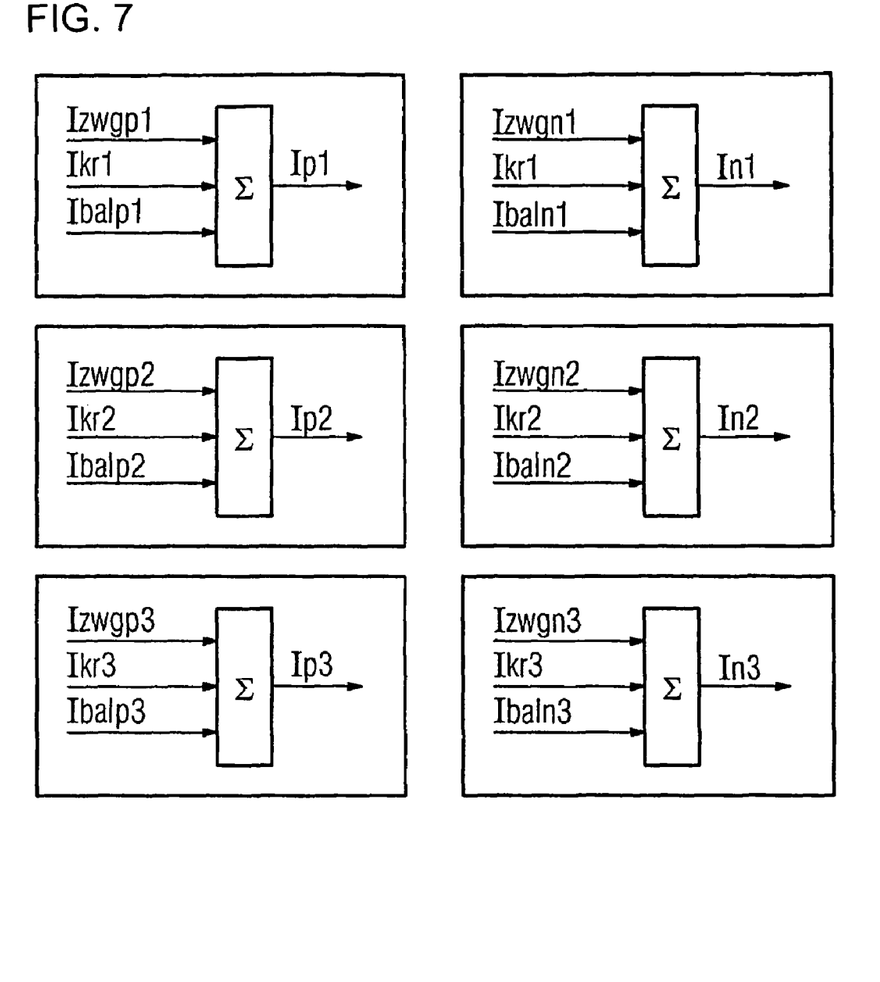
FIG. 7 shows a schematic illustration relating to the determination of the extended branch current values Ip as shown in FIG. 6.

The determination of the extended branch current values Ip1, Ip2, Ip3, In1, In2, In3 is illustrated in FIG. 7. The extended branch current values Ip1, Ip2, Ip3, In1, In2, In3 with respect to the phase module branch 6$p$1 are nothing more than the sum of phase module branch current measured values Izwgp1, a circulating-current nominal value Ikr1 and a balancing current nominal value Ibal1, formed by a current transformer. The circulating-current nominal values Ikr1, Ikr2 and Ikr3 can be dynamically preset via a control station, which is not illustrated in the figures. A corresponding situation applies to the balancing current nominal values Ibalp1, Ibalp2 and Ibalp3. Each extended branch current value Ip1 therefore comprises both measured values and nominal values. The energy which is stored in each of the phase module branches is distributed in a balanced manner by means of the balancing nominal values.

Figure 8:
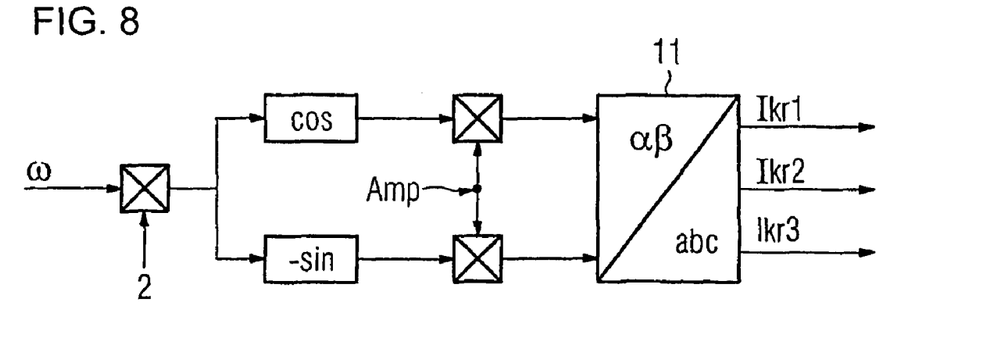
FIG. 8 shows a schematic illustration of one possible way to produce circulating-current nominal values Ikr.

FIG. 8 shows one advantageous example relating to the production of suitable circulating-current nominal values Ikr1, Ikr2, Ikr3. First of all, the angular frequency of the network voltage ω is multiplied by a factor of 2. The cosine or the negative sine of the argument 2ω is then formed, and is then multiplied by an amplitude Amp. A respective circulating-current nominal value Ikr1, Ikr2, Ikr3 is then determined from the two variables, using a conversion unit 11, for each of the three phase modules.

Figure 9:
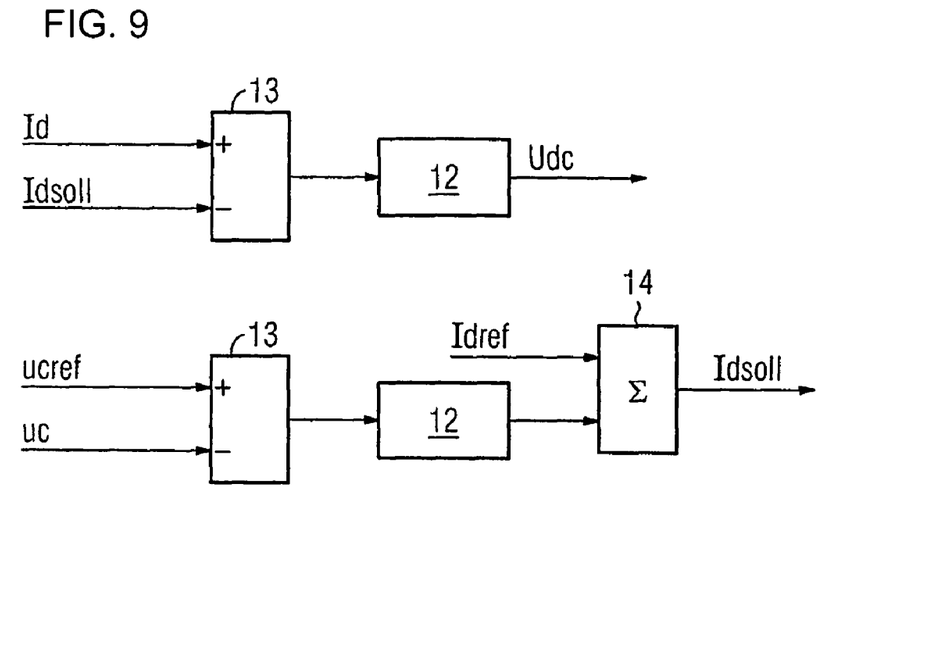
FIG. 9 shows a schematic illustration relating to the determination of a DC voltage nominal value Udc.

FIG. 9 illustrates the determination of the DC voltage nominal value Udc. Udc is determined on the basis of a measured DC value Id and a reference DC value Idsoll, with the process of determining the reference DC value Idsoll being described in the following text. First of all, the difference is formed between the measured DC value Id and the reference DC value Idsoll. The difference is then supplied to a proportional regulator or to a proportional/integral regulator, that is to say a PI regulator, 12, at whose output the DC voltage nominal value Udc can be tapped off.

The lower part of FIG. 9 shows how the reference DC value Idsoll can be determined. This is done by first of all forming a total energy measured value uc which is equal to the sum of all the capacitor voltage values Uc of the apparatus 1 according to the invention. The total energy measured value Uc therefore represents a measure of the energy stored in the respective converter. A measure such as this can be derived in any other desired manner. In order to ensure that said energy does not become excessively high, the total energy measured value uc is compared with a sum voltage nominal value ucref by using a subtractor 13 to form the difference. Said difference is then supplied to a regulator 12, at whose output a total energy discrepancy current value can be read, which is supplied to an adder 14. The adder 14 forms the sum of the total energy discrepancy current value and a DC nominal value Idref, which is known by the current regulation unit, with the reference DC nominal value Idsoll being obtained. This determination of the DC voltage nominal value Udc therefore makes it possible for the regulation system to avoid the storage of an excessive amount of energy in the capacitors 8 in the converter 1.

Figure 10:
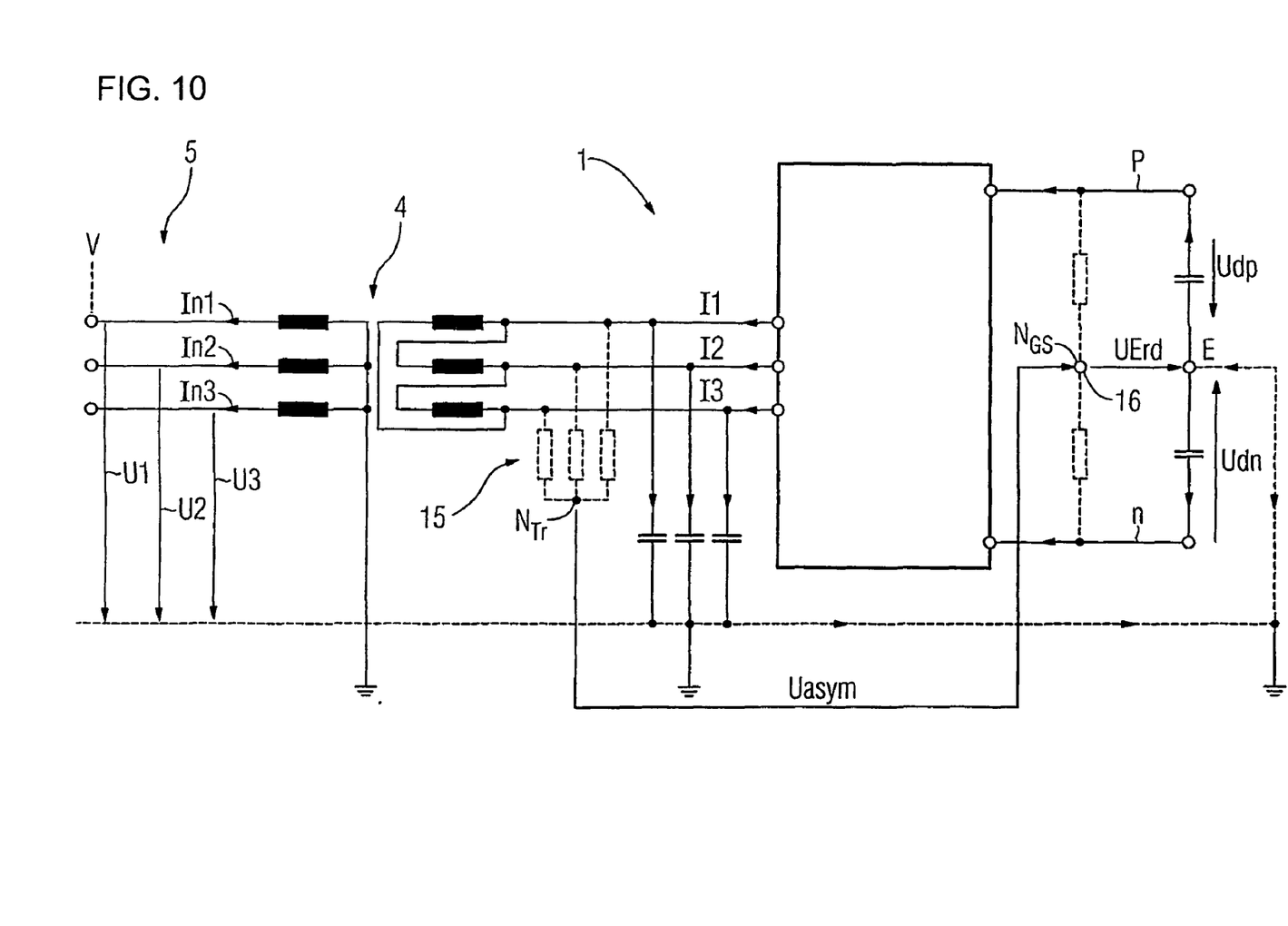
FIG. 10 shows an overview in order to illustrate the determination of the balancing voltage Uasym.

FIG. 10 physically illustrates the significance of an unbalanced voltage Uasym. FIG. 10 illustrates a star-point former 15 by means of dashed lines on the AC voltage side of the phase modules of the apparatus 1 according to the invention. A voltage divider 16 can likewise be seen in the form of dashed lines in the DC voltage circuit p, n, having the same resistance on both sides of the potential point $N_{GS}$. The unbalanced voltage Uasym is the voltage between the star point $N_{TR}$ of the star-point former 15 and the potential point $N_{GS}$. This is determined first of all by measurement of the voltage between the positive DC voltage p and ground, with a positive DC voltage value Udp being obtained, and by measurement of the voltage between the negative pole of the DC voltage and ground, with a negative DC voltage value Udn being obtained. The difference between the magnitudes of the negative DC voltage value Udn and the positive DC voltage value Udp is then formed, thus resulting in a DC voltage difference ΔUd. The DC voltage difference ΔUd is applied to the input of a regulator, with a DC voltage nominal difference also being preset for the regulator, thus resulting in a value being produced at the output of the regulator, by means of which the regulation process minimizes the difference between the DC voltage difference and the DC voltage nominal difference. The balancing nominal voltage Uasym can be tapped off at the output of the regulator and can be applied to other voltage intermediate nominal values, on the basis of the linear combination as illustrated in FIG. 4.

The balancing voltage nominal values Ubalp1, Ubalp2, Ubalp3, Ubaln1, Ubalp2 and Ubalp3 are determined as follows: first of all, the capacitor voltage values Uc are determined by measurement of the voltage across the capacitors in the submodules 7, and are added, with branch energy actual values UcΣp1, UcΣp2, UcΣp3, UcΣn1, UcΣn2, UcΣn3 being obtained. All the submodules of the respective phase module branch are taken into account in this process, to be precise irrespective of whether the respective submodule is or is not switched on. The branch energy actual value is therefore a measure of the energy stored in the phase module. The branch energy actual values are therefore respectively associated with a phase module branch 9*p*1, 9*p*2, 9*p*3, 9*n*1, 9*n*2 and 9*n*3. The branch energy actual values UcΣp1, UcΣp2, UcΣp3, UcΣn1, UcΣn2, UcΣn3 are compared with one another, and a value is derived from the comparison. This value is then transmitted with a nominal value to a regulator, at whose output the balancing voltage nominal values Ubalp1, Ubalp2, Ubalp3, Ubaln1, Ubaln2, Ubaln3 can be tapped off.

Figure 11:
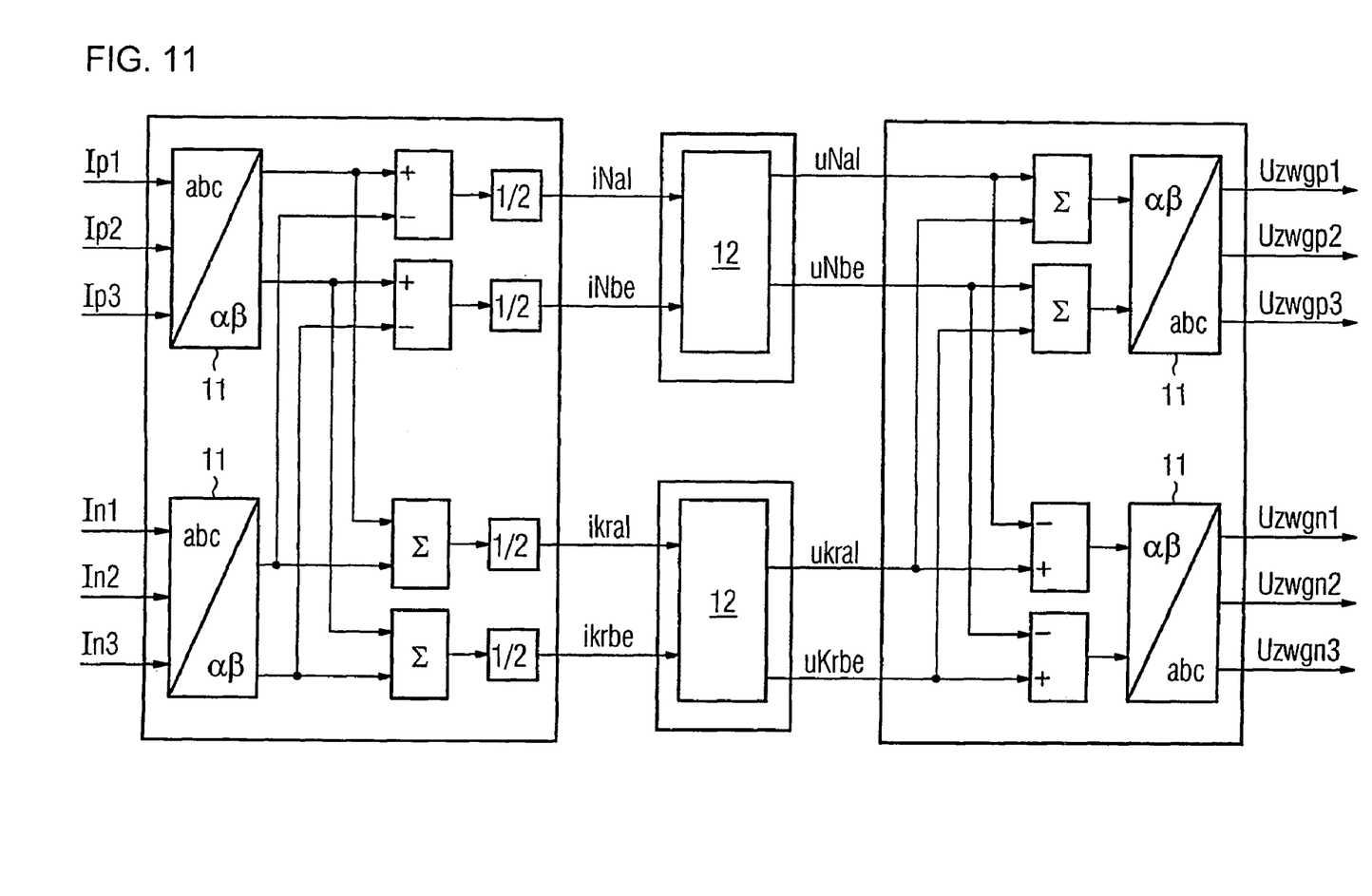
FIG. 11 shows a further possible way to produce branch voltage intermediate nominal values Uzwg.

FIG. 11 shows a further possible way to determine the branch voltage intermediate nominal values Uzwgp1, Uzwgp2 and Uzwgp3 on the basis of the extended branch current values Ip1, Ip2, Ip3 and In1, In2 and In3. First of all, the extended branch current values Ip1, Ip2, Ip3 and In1, In2 and In3 are converted by conversion units 11 from a three-dimensional vector space to a two-dimensional vector space α, β. The regulation process for a network current component and for a circulating current component are then carried out independently of one another. Network current components iNal and the network current component iNbe are thus formed by a suitable linear combination and are supplied to a regulator 12 with two nominal values, which are not illustrated. The regulator 12 forms an α-value uNal and a β-value uNbe for the network current component at its output. The regulation process is carried out in a corresponding manner for the circulating current component. This results in circulating current values ikral and ikrbe, in which case network voltage circulating components ukral and ukrbe can be tapped off at the output of the regulator 12, which is shown at the bottom in FIG. 11. The branch voltage intermediate nominal values Uzwgp1 to Uzwgp3 are obtained by suitable linear combination and conversion to three-phase space.

Figure 12:
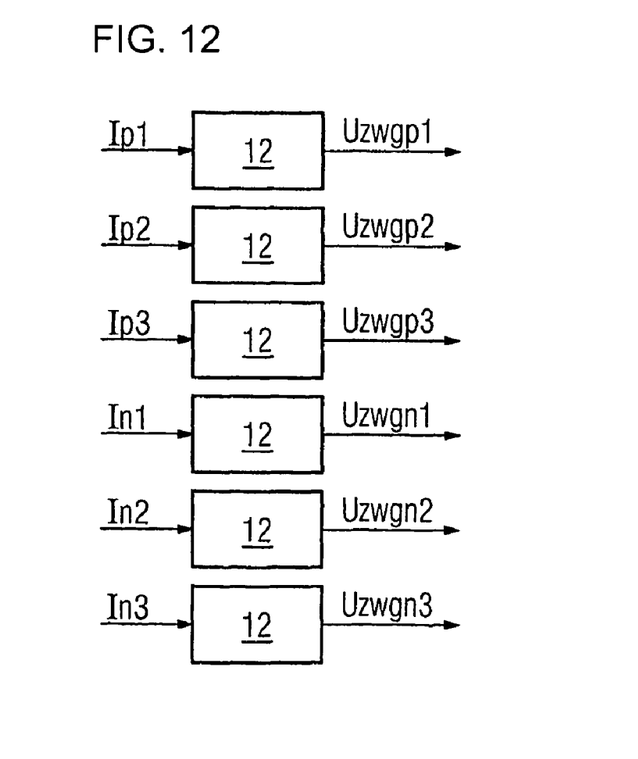
FIG. 12 shows a further possible way to determine branch voltage intermediate nominal values Uzwg and FIG. 13 shows a further possible way to determine branch voltage intermediate nominal values Uzwg.

In contrast to the method proposed in FIG. 11, the branch voltage intermediate nominal values Uzwgp1 to Uzwgn3 can also be determined independently of one another on the basis of the extended current values Ip1, Ip2 and Ip3. To this end— as can be seen in FIG. 12—a separate regulator 12 is provided for each extended branch current value Ip1 to In3, with the extended branch current values Ip1 to In3 being determined as stated above. By way of example, the regulator 12 is a proportional regulator.

Figure 13:
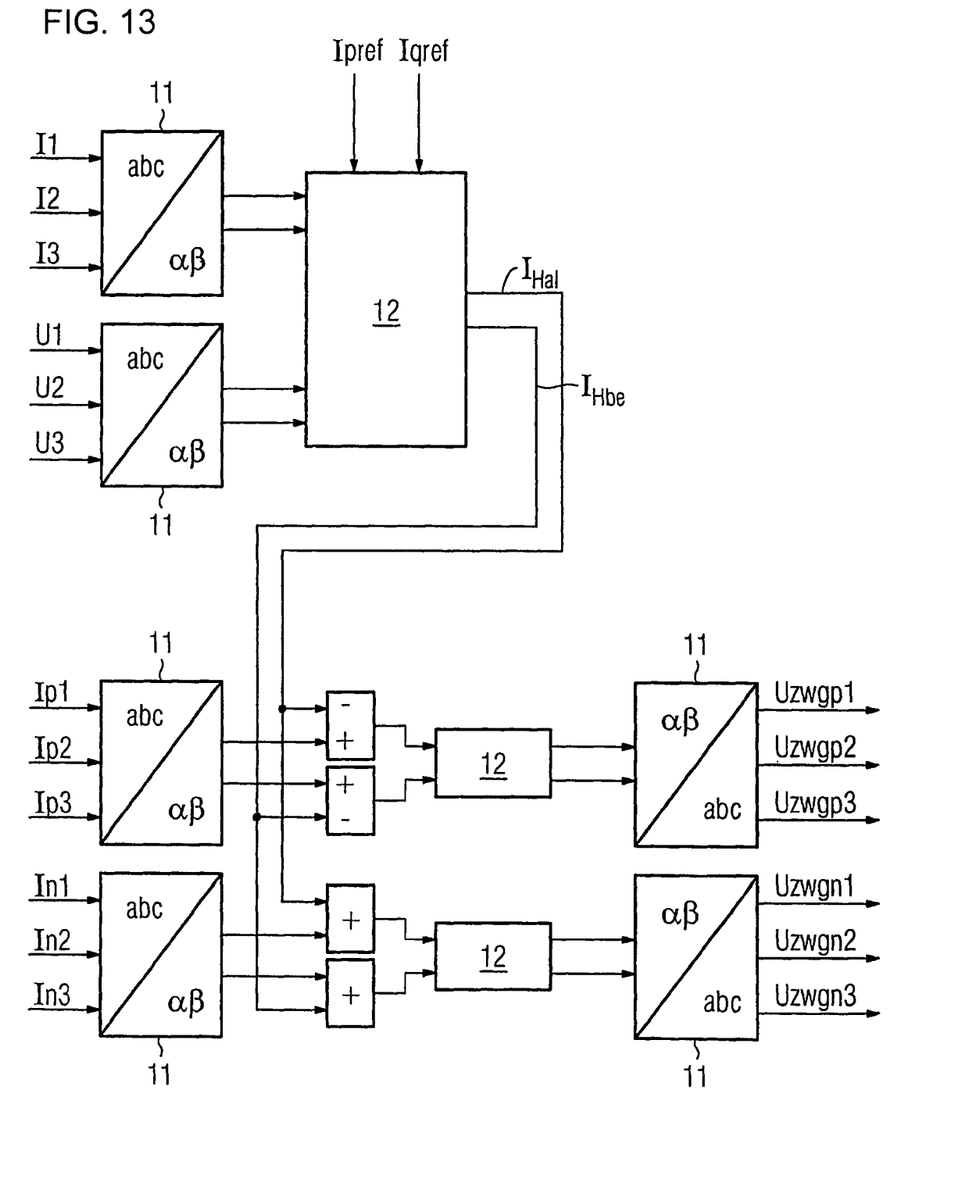

FIG. 13 shows a further method for determination of the branch voltage intermediate nominal values Uzwgp1, . . . , Uzwgn3. First of all, the phase current measured values I1, I2 and I3 and phase voltage measured values U1, U2 and U3 are converted from three-phase space to a two-phase space α, β, and the respective converted measured values are supplied to a vector regulator 12. An in-phase current nominal value Ipref and the reactive current nominal value Iqref are also supplied to the regulator 12. At its output, the vector regulator 12 produces auxiliary current values IHal and IHbe on the basis of the difference between the in-phase current nominal value and the in-phase current measured value, as determined from the measured values, and, at the same time, the difference between the reactive current measured values and the reactive current nominal value being minimal. The auxiliary current values IHa1, IHbe are then linearly combined, as indicated in FIG. 13, with extended branch current values Ip1, . . . , Ip3. As has already been stated, the extended branch current values Ip1 to In3 comprise nominal current values by means of which the regulator 12 produces two-dimensional branch voltage values α, β, and the conversion unit 11, finally, produces three-phase branch voltage intermediate nominal values Uzwgp1 to Uzwgp3.

The invention claimed is:

1. An apparatus for converting an electric current, comprising:
    at least one phase module having an AC voltage connection and at least one DC voltage connection with a phase module branch formed between each said DC voltage connection and each said AC voltage connection, each phase module branch including a series circuit of submodules each having an energy storage device and at least one power semiconductor;
    measurement sensors for providing actual values; and
    closed-loop control means connected to said measurement sensors and configured to regulate the apparatus in dependence on the actual values and predetermined nominal values, said control means having a current regulation unit and drive units each associated with a respective said phase module branch;
    wherein said current regulation unit is configured to provide branch nominal values for said drive units, and wherein said drive units are connected between said submodules and said drive unit is configured to produce control signals for said submodules.

2. The apparatus according to claim 1, wherein each said submodule has a submodule sensor connected to said drive unit associated with the respective said submodule and outputting a submodule actual value.

3. The apparatus according to claim 2, wherein the submodule actual value is an energy storage device voltage value Uc, defined by a voltage across said energy storage device of the respective said submodule.

4. The apparatus according to claim 1, wherein each drive unit is connected to all said submodule sensors of said phase module branch associated therewith and is configured to provide a sum actual value for said current regulation unit, with a sum actual value being a sum of all the submodule actual values of the respective said phase module branch.

5. The apparatus according to claim 1, wherein said current regulation unit is configured to provide a branch voltage nominal value Up1ref for each said drive unit.

6. The apparatus according to claim 1, wherein said measurement sensors include branch current sensors configured to measure phase branch currents Izwg flowing in said phase module branches.

7. The apparatus according to claim 6, wherein said current regulation unit is configured to regulate the phase branch currents Izwg.

8. The apparatus according to claim 1, wherein the nominal values are selected from the group consisting of a reactive current nominal value Iqref and an in-phase current nominal value Ipref, and/or a DC nominal value Id.

9. A method for converting a current, which comprises:
    providing a converter with at least one phase module having at least one DC voltage connection and an AC voltage connection, with a phase module branch formed between each DC voltage connection and AC voltage connection and having a series circuit of submodules each having an energy storage device and at least one power semiconductor;
    supplying a current regulation unit with actual values and with nominal values, the current regulation unit defining branch nominal values in dependence on the actual values and the nominal values by way of a closed-loop controller, wherein the branch nominal values are respectively associated with one phase module branch; and
    supplying each of the branch nominal values to a drive unit, and producing with each drive unit control signals for the submodules associated therewith, in dependence on the module branch nominal values.

10. The method according to claim 9, wherein the actual values comprise branch energy actual values which are transmitted by the drive units to the current regulation unit, and the method comprises forming the branch energy actual values by adding submodule actual values detected in the submodules.

11. The method according to claim 9, which comprises forming the branch nominal values by a linear combination of voltage intermediate nominal values.

12. The method according to claim 11, wherein the voltage intermediate nominal values comprise a DC voltage nominal value, and the method comprises determining the DC voltage nominal value as a function of a difference between a predetermined reference DC value Idsoll and a DC measured value Id obtained by measurement.

13. The method according to claim 12, which comprises determining a total voltage difference by formation of a difference between a predetermined sum voltage nominal value ucref and a total energy measured value uc determined by addition of the voltages across all the energy storage devices of the converter, and supplying the total voltage difference to a regulator with a total energy discrepancy current value being obtained, and adding the total energy discrepancy current value to a DC nominal value Idref, to obtain the reference DC value Idsoll being obtained.

14. The method according to claim 11, wherein the voltage intermediate nominal values for each drive unit comprise a network phase voltage nominal value Unetz1, Unetz2, Unetz3.

15. The method according to claim 14, which comprises determining the network phase voltage nominal values Unetz1, Unetz2, Unetz3 from phase current values I1, I2, I3, which are obtained by measuring the phase currents on the AC voltage sides of the phase modules as a function of current nominal values, by means of a regulator.

16. The method according to claim 14, which comprises determining the network phase voltage nominal values Unetz1, Unetz2, Unetz3 as a function of phase voltage values U1, U2, U3, which are obtained by measuring the phase voltages on the AC voltage sides of the phase modules as a function of nominal values, by means of a regulator.

17. The method according to claim 11, wherein the voltage intermediate nominal values for each phase module branch comprise a branch voltage intermediate nominal value Uzwgp1, Uzwgp2, Uzwgp3, Uzwgn1, Uzwgn2, Uzwgn3.

18. The method according to claim 11, which comprises determining the branch voltage intermediate nominal values Uzwgp1, Uzwgp2, Uzwgp3, Uzwgn1, Uzwgn2, Uzwgn3 as a function of extended branch current values Ip1, Ip2, Ip3, In1, In2, In3, by means of a regulator.

19. The method according to claim 17, which comprises breaking down extended branch current values Ip1, Ip2, Ip3, In1, In2, In3 as input variables of the regulation system into a network current component and a circulating current component, in order to determine the branch voltage intermediate nominal values Uzwgp1, Uzwgp2, Uzwgp3, Uzwgn1, Uzwgn2, Uzwgn3.

20. The method according to claim 18, which comprises determining each extended branch current value lp1,lp2,lp3, ln1, ln2, ln3 by forming a sum of a phase module branch current measured value lzwgp1, lzwgp2, lzwgp3, lzwgn1, lzwgn2, lzwgn3, which is obtained by detecting a phase module branch current flowing in the respective phase module branch, of defined circulating-current nominal values lkr1, lkr2, lkr3 and of defined balancing current nominal values lbalp1, lbalp2, lbalp3, lbaln1, lbaln2, lbaln3, with the balancing current nominal values lbalp1, lbalp2, lbalp3, lbaln1, lbaln2, lbaln3 being determined as a function of the branch energy actual values of the phase module branches.

21. The method according to claim 18, which comprises regulating each extended branch current value lp1, lp2, lp3, ln1, ln2, ln3 independently of the remaining branch current values lp1, lp2, lp3, ln1, ln2, ln3.

22. The method according to claim 18, which comprises:
   obtaining phase current values l1, l2, l3 by measuring the phase currents on the AC voltage side and obtaining phase voltage values U1, U2, U3 by measuring the phase voltages on the AC voltage sides of the phase module branches;
   determining auxiliary current values lHa1, lHbe from the phase current values l1, l2, l3 and the phase voltage values U1, U2, U3 as a function of nominal values, by means of a regulator;
   adding the auxiliary current values lHa1, lHbe to or subtracting the auxiliary current values lHa1, lHbe from the extended branch current values lp1, lp2, lp3, ln1,ln2, ln3, to obtain auxiliary sums or auxiliary differences, respectively; and
   applying the auxiliary sums and/or auxiliary differences to an input of the regulator, and tapping off the branch voltage intermediate nominal values Uzwgp1, Uzwgp2, Uzwgp3, Uzwgn1, Uzwgn2, Uzwgn3 at an output of the regulator.

23. The method according to claim 11, wherein the branch voltage intermediate nominal values have an unbalanced nominal voltage Uasym.

24. The method according to claim 23, which comprises defining the unbalanced nominal voltage Uasym by:
   measuring a voltage between a positive DC connection and ground, to obtain a positive DC voltage value Udp, and measuring a voltage between a negative DC voltage connection and ground, to obtain a negative DC voltage value Udn;
   forming a difference between the magnitude values of the positive DC voltage value Udp and the negative DC voltage value Udn, to obtain a DC voltage difference $\Delta ud$; and
   applying the DC voltage difference $\Delta ud$ to an input of a regulator, to obtain the unbalanced nominal voltage Uasym at an output of the regulator.

25. The method according to claim 11, wherein the branch voltage intermediate nominal values include balancing voltage nominal values Ubalp1, Ubalp2, Ubalp3, Ubaln1, Ubaln2, Ubaln3, and the method which comprises:
   detecting energy storage device voltage values Uc that correspond to the voltages across the energy storage devices;
   summing the energy storage device voltage values Uc of a phase module branch to obtain branch energy actual values Uc$\Sigma$p1, Uc$\Sigma$p2, Uc$\Sigma$p3, Uc$\Sigma$n1, Uc$\Sigma$n2, Uc$\Sigma$n3, and comparing the branch energy actual values Uc$\Sigma$p1, Uc$\Sigma$p2, Uc$\Sigma$p3, Uc$\Sigma$n1, Uc$\Sigma$n2, Uc$\Sigma$n3 with one another;
   transmitting a value derived from the comparison to a regulator, and tapping off the balancing compensation voltages Ubalp1, Ubalp2, Ubalp3, Ubaln1, Ubaln2, Ubaln3 at the output of the regulator.

* * * * *